United States Patent
Walvoort et al.

(10) Patent No.: US 11,357,208 B2
(45) Date of Patent: Jun. 14, 2022

(54) MILKING DEVICE

(71) Applicant: LELY PATENT N.V., Maassluis (NL)

(72) Inventors: Wilbert Timotheus Walvoort, Maassluis (NL); Michiel Adriaan Van Dorp, Maassluis (NL); Gerard Mostert, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 611 days.

(21) Appl. No.: 16/060,669

(22) PCT Filed: Dec. 8, 2016

(86) PCT No.: PCT/NL2016/050856
§ 371 (c)(1),
(2) Date: Jun. 8, 2018

(87) PCT Pub. No.: WO2017/099595
PCT Pub. Date: Jun. 15, 2017

(65) Prior Publication Data
US 2018/0359984 A1    Dec. 20, 2018

(30) Foreign Application Priority Data
Dec. 11, 2015 (NL) .................................. 2015944

(51) Int. Cl.
*A01J 5/04* (2006.01)
*A01J 5/10* (2006.01)
*A01J 5/007* (2006.01)

(52) U.S. Cl.
CPC ............... *A01J 5/048* (2013.01); *A01J 5/007* (2013.01); *A01J 5/10* (2013.01)

(58) Field of Classification Search
CPC .... A01J 5/007; A01J 5/14; A01J 5/048; A01J 5/045; A01J 5/16
See application file for complete search history.

(56) References Cited

U.S. PATENT DOCUMENTS

| 2,832,314 A * | 4/1958 | Cyphers | A01J 5/10 |
| | | | 119/14.38 |
| 3,726,253 A * | 4/1973 | Duncan | A01J 5/08 |
| | | | 119/14.18 |

(Continued)

FOREIGN PATENT DOCUMENTS

| EP | 0017493 A1 * | 10/1980 | ......... G05D 16/0672 |
| WO | WO 97/01270 A1 | 1/1997 | |

(Continued)

OTHER PUBLICATIONS

International Search Report dated Mar. 8, 2017, issued in PCT/NL2016/050856, filed Dec. 8, 2016.

(Continued)

*Primary Examiner* — Peter M Poon
*Assistant Examiner* — Morgan T Barlow
(74) *Attorney, Agent, or Firm* — Oblon, McClelland, Maier & Neustadt, L.L.P.

(57) ABSTRACT

A milking device for milking a dairy animal includes a teat cup with a cup wall and a teat liner and a pulsation space situated in between, the pulsation space being connected to a pulsation device that is configured to apply a pressure that varies in pulsations to the pulsation space in order to open and close the teat liner. The pulsation device includes a supply line controllable by a first operable valve for supplying a first pressure, a supply line controllable by a second operable valve for supplying a second pressure lower than the first pressure, and a control unit configured to generate control signals for operating the first and second valves. At least the first valve is a controllable valve having a passage that is adjustable during at least one pulsation phase by the control unit.

18 Claims, 3 Drawing Sheets

(56) References Cited

U.S. PATENT DOCUMENTS

Figure 1:
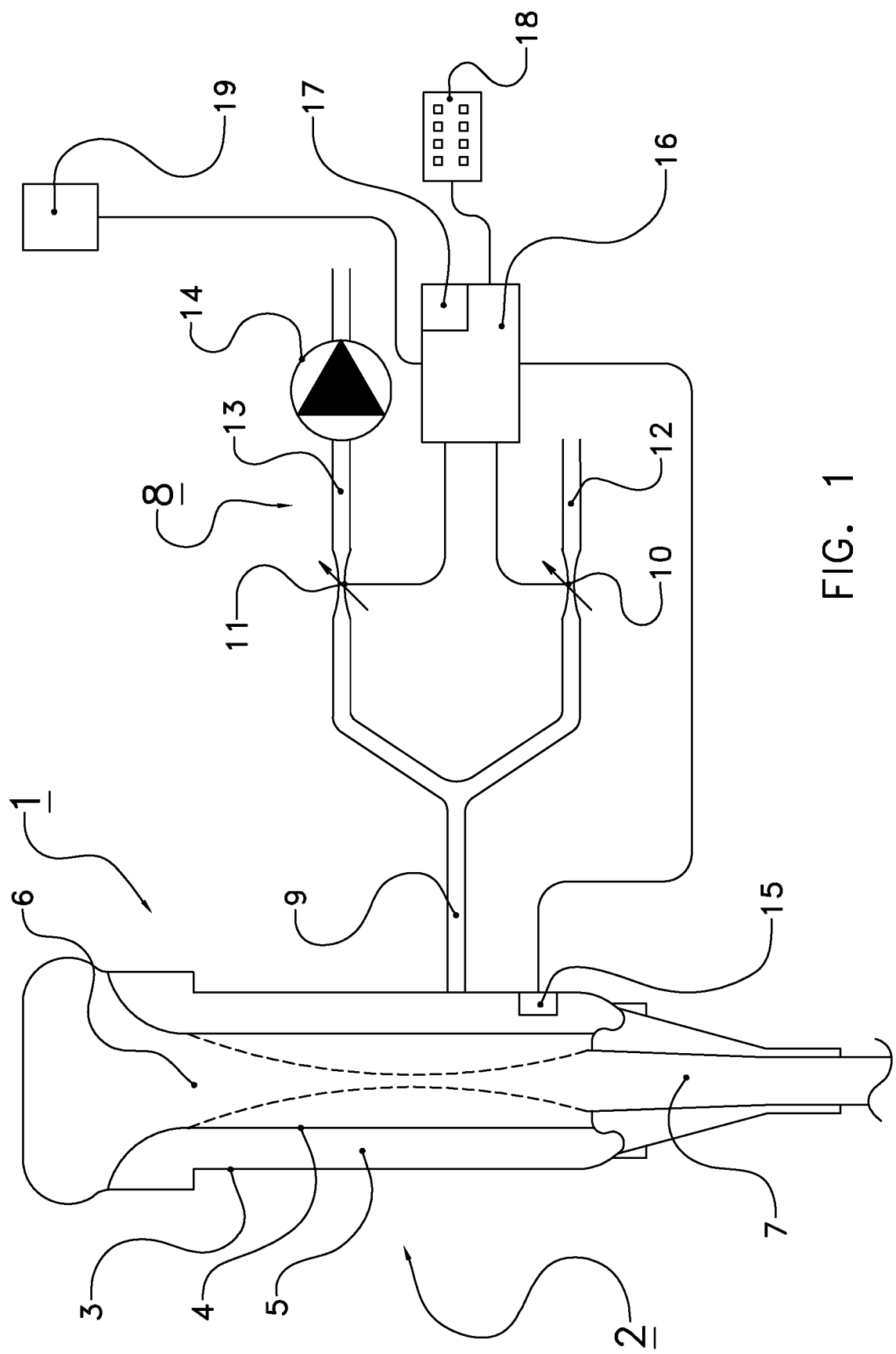

| | | | | |
|---|---|---|---|---|
| 3,783,837 A * | 1/1974 | Olander | ......... | A01J 5/007 119/14.08 |
| 4,175,514 A * | 11/1979 | Souza | ......... | A01J 7/025 119/14.08 |
| 4,499,854 A * | 2/1985 | Hoefelmayr | ......... | A01J 5/044 119/14.32 |
| 4,513,766 A * | 4/1985 | Seaborne | ......... | A01J 5/12 137/103 |
| 5,178,095 A * | 1/1993 | Mein | ......... | A01J 5/007 119/14.02 |
| 5,218,924 A * | 6/1993 | Thompson | ......... | A01J 5/007 119/14.02 |
| 5,275,124 A * | 1/1994 | van der Lely et al. | ......... | A01J 7/022 119/14.08 |
| 5,613,514 A * | 3/1997 | Tan | ......... | A01J 5/007 137/102 |
| 5,651,329 A | 7/1997 | Van Den Berg et al. | | |
| 5,697,325 A * | 12/1997 | Gehm | ......... | A01J 5/007 119/14.28 |
| 5,881,669 A | 3/1999 | Van Den Berg et al. | | |
| 5,970,910 A * | 10/1999 | Grimm | ......... | A01J 5/007 119/14.02 |
| 6,164,242 A | 12/2000 | Olofsson | | |
| 6,494,163 B1 | 12/2002 | Oort | | |
| 6,990,924 B2 * | 1/2006 | Brown | ......... | A01J 5/007 119/14.01 |
| 8,468,970 B2 * | 6/2013 | Sandberg | ......... | A01J 5/007 119/14.02 |
| 8,683,945 B2 * | 4/2014 | Wartenhorst | ......... | A01J 5/007 119/14.02 |
| 2003/0051668 A1 * | 3/2003 | Watanabe | ......... | A01J 5/007 119/14.44 |
| 2003/0226506 A1 * | 12/2003 | van den Berg | ......... | A01J 5/04 119/14.02 |
| 2007/0113790 A1 * | 5/2007 | Akerman | ......... | A01J 5/0134 119/14.02 |
| 2007/0137580 A1 * | 6/2007 | Brown | ......... | A01J 5/14 119/14.14 |
| 2008/0127896 A1 * | 6/2008 | Petterson | ......... | A01J 5/007 119/14.02 |
| 2010/0236484 A1 | 9/2010 | Sandbert et al. | | |
| 2011/0168098 A1 * | 7/2011 | Gehm | ......... | A01J 5/14 119/14.25 |
| 2011/0239943 A1 * | 10/2011 | Hanskamp | ......... | A01J 5/08 119/14.02 |
| 2012/0160174 A1 * | 6/2012 | Gudmundsson | ......... | A01J 7/022 119/14.02 |
| 2012/0272901 A1 * | 11/2012 | Gehm | ......... | A01J 5/007 119/14.02 |
| 2013/0125821 A1 * | 5/2013 | Gibbs | ......... | A01J 5/007 119/14.02 |
| 2013/0319336 A1 * | 12/2013 | Thompson | ......... | A01J 5/0133 119/14.02 |
| 2014/0174366 A1 * | 6/2014 | Wilson | ......... | A01J 5/007 119/14.02 |
| 2014/0373787 A1 * | 12/2014 | Petterson | ......... | A01J 5/01 119/14.02 |
| 2015/0000601 A1 * | 1/2015 | Mostert | ......... | A01J 5/044 119/14.02 |
| 2015/0040830 A1 * | 2/2015 | Leeuwen | ......... | A01J 5/047 119/14.02 |
| 2017/0303496 A1 * | 10/2017 | Fematt | ......... | A01J 5/0133 |
| 2018/0338466 A1 * | 11/2018 | Van Dorp | ......... | A01J 5/04 |
| 2018/0359984 A1 * | 12/2018 | Walvoort | ......... | A01J 5/007 |

FOREIGN PATENT DOCUMENTS

| | | | | |
|---|---|---|---|---|
| WO | WO 2007/089185 A1 | 8/2007 | | |
| WO | WO-2012022356 A1 * | 2/2012 | ............. | A01J 5/007 |
| WO | WO 2009/043189 | 10/2021 | | |

OTHER PUBLICATIONS

Opposition filed in corresponding European Application No. WO16815989.5/3386292 dated Oct. 26, 2021.

* cited by examiner

MILKING DEVICE

The present invention relates to a milking device for milking a dairy animal, and comprising a teat cup with a cup wall and a teat liner and a pulsation space situated in between, to which pulsation space a pulsation device is connected which is configured to apply a pressure that varies in pulsations to the pulsation space in order to open and close the teat liner.

Such automatic milking devices have been known in the prior art for a long time. Thus, WO02/05629 describes a pulsator control with a controllable pulsator valve for alternately connecting a vacuum source and ambient pressure to the pulsation space of a milking cup.

In practice, it has been found that a problem occurs with many known pulsation devices and milking devices, with the teat liner suddenly folding at a certain value of said pressure and hitting the teat when the pulsation space is connected to the higher (ambient) pressure. This folding, caused by the inherent elasticity of the teat liner, may cause damage and irritation to the teat, which is undesirable.

It is an object of the present invention to counteract said drawback, at least partly, and to this end it provides a milking device according to claim 1, in particular a milking device for milking a dairy animal, and comprising a teat cup with a cup wall and a teat liner and a pulsation space situated in between, to which pulsation space a pulsation device is connected which is configured to apply a pressure that varies in pulsations to the pulsation space in order to open and close the teat liner, and which pulsation device comprises a supply line for supplying a first pressure, which supply line is controllable, in particular closable, by a first operable valve, a supply line for supplying a second pressure, which is a lower pressure than the first pressure, which supply line is controllable, in particular closable, by a second operable valve, and a control unit which is configured to generate control signals for operating the first valve and the second valve, wherein the first valve, and preferably also the second valve, is a controllable valve having a passage which is adjustable by means of the control signals, wherein the passage of the first valve, and preferably of the second valve, respectively, is adjustable during at least one pulsation phase by the control unit via the control signals.

It should be noted here that "adjustable passage" is understood to mean that the passage is adjustable by the control device in at least one intermediate position between a most open position and a most closed position. In turn, "adjustable" means that the passage is actively driven and controlled to a position corresponding to the control signals. With a known prior-art pulsator valve which can be controlled from a fully open position to a fully closed position and vice versa, all intermediate passage positions are obviously also assumed, but these are not at all controlled or regulated and can therefore not serve as an adjustment parameter. Thus, the pulsator valve in WO02/05629 is only fully opened and closed on repeated occasions, which limits the possibilities of adjustment and may, in addition, result in increased wear, both of the valve itself, in particular the valve seats, and of the control unit.

The present invention offers the advantage that the control options for the pulsator valve or even pulsator valves increase, resulting in more possibilities of influencing the pressure course in the pulsation space during a pulsation. In this way, more possibilities are provided in order to counteract in particular the aforementioned drawbacks of the teat liner folding. Thus, it is for example possible to influence, in particular reduce, the passage of the valve on the basis of a calibration or other measurements, just before the varying pressure in the pulsation space reaches a value at which the teat liner will fold. Folding will thus occur much more slowly, which greatly reduces the strain on the teats. All this will be explained in more detail below.

Further particular embodiments and examples are described in the dependent claims and the description of the figures, as well as in the description below.

In a first particular embodiment, the first and the second valve are each a controllable valve having a passage which is adjustable by means of control signals and the respective passages of the first valve and the second valve are adjustable during at least one pulsation phase by the control unit via the control signals. Thus, it is also possible to influence the pressure course inside the pulsation space favorably during other pulsation phases, in particular the phase in which a vacuum is produced in the pulsation space and in which folding occurs, but in this case from a position bearing against the teat to the open position.

It should be noted in this case that, in the prior art, a pulsation is divided into 4 phases, i.e. a, b, c, and d phases. In this case, the a phase is the phase in which the pressure in the pulsation space is changed from atmospheric (or another starting pressure) to a pulsation vacuum (or another correspondingly lower pressure), which pressures are here referred to as the first pressure and the second pressure, respectively. The b phase is the phase in which the lower pressure prevails in the pulsation space, which phase is also referred to as the suction or milking phase. In the c phase, the pressure in the pulsation space is returned to atmospheric (or another higher first pressure). Finally, the d phase is characterized by an atmospheric (or higher, first) pressure prevailing in the pulsation space, which d phase is referred to as the rest stroke. The four phases may also be characterized as follows: in the a phase, the teat liner opens, in the b phase, the teat liner is open, in the c phase, the teat liner closes, in the d phase, the teat liner is closed, all this completely in accordance with the prior art.

In embodiments, the passage of the first and/or of the second valve is adjustable in several intermediate positions by the control unit via the control signals during a pulsation phase. This means that the passage of the respective valve(s) between the most open and most closed position is furthermore adjustable in more than one intermediate position. Obviously, this increases the number of possibilities to influence the pressure course over time. In general, it will hold true that a larger number of adjustable intermediate positions allows for greater versatility in influencing the pressure course.

In particular, the passage of the first and/or of the second valve is continuously adjustable in several intermediate positions by the control unit via the control signals during a pulsation phase. This provides a maximum influencing opportunity.

In embodiments, the pulsation has a usual a, b, c and d phase, and the passage of the first and/or of the second valve during the c phase and/or the a phase is adjustable by the control unit, via the control signals, in several intermediate positions with alternately enlarged and reduced passages. As has already been indicated above, the c phase relates to the phase in which the teat liner will move from open to closed and the a phase relates to the reverse movement from closed to open. Since now, in addition, the passage can alternately be enlarged and reduced during a pulsation phase, the influencing opportunities are increased still further. In particular, this may be seen in the case of the folding of the teat liner. During this folding, the volume of the pulsation space is changed by more than just the flow of air from or to the pulsation space. This also means that the pressure course will show a ripple over time. This folding is caused by the elastic properties of the teat liner, wherein a mechanical resistance in the teat liner is overcome by the pressure difference across the teat liner. It could be said that the folding and the associated change in volume causes an additional air flow. In order to counteract the effect thereof, it is advantageous to concomitantly change the airflow through the first and/or second valve in a targeted manner. In order to counteract the usual ripple in the pressure course, it may be advantageous to make the passage of the first and/or second valve smaller than before for a short time or, on the contrary, make the passage larger for a short time in order then to continue with a larger or smaller passage, respectively. Obviously, more variations are also possible. Therefore, in particular embodiments the respective passages of the first valve and the second valve are alternately and/or repeatedly adjustable by the control unit via the control signals during at least one pulsation phase. As a result thereof, the influencing opportunities of the pressure course in the pulsation space are innumerable.

In particular embodiments, the respective passages of the first valve and the second valve are simultaneously adjustable by the control unit via the control signals during at least one pulsation phase. In this case, it is thus possible for both valves to be in an open position at the same time. It is also possible that a first one of the valves is opened first during a pulsation phase, is subsequently closed, following which the other one of the valves is opened and closed again, still during the same pulsation phase, either completely or only partially, as desired, etc. A significant advantage of these embodiments is that even if the pressure in the pulsation space decreases (a phase) or increases (c phase), it may sometimes be favorable to partly counteract the associated discharge or supply, respectively, of air. All this has, in particular, a possible positive effect on the folding of the teat liner, which effects may be mitigated even more efficiently by a partly opposite air flow.

In embodiments, at least one of the first and the second valve comprises an electromagnetic valve. Such valves may comprise, for example, a magnetic or magnetizable valve body and a coil, which coil can generate an alternating and controllable electromagnetic field to control the valve body, and thus the valve(s). Such valves may be controlled accurately and simply with regard to their passage. Nevertheless, other controllable valves are also possible, such as mechanically controlled butterfly valves, etc.

In a particular embodiment, the milking device furthermore comprises a pulsation pressure gauge for measuring a value of the pressure in the pulsation space and sending the measured pressure value to the control unit, and the passage of the first and/or of the second valve is adjustable by the control unit via the control signals in dependence of the measured pressure value. Due to the fact that the pressure value in the pulsation space can be measured with the pulsation pressure gauge and can be sent to the control unit, the control unit can take it into account and adjust the passage of the first and/or the second valve as desired or to correspond with the measured pressure value. Thus, the pressure course in the pulsation space can be influenced efficiently. It should be noted here that any other sensor which can either measure a value of a parameter representative for the pressure value or a sensor which can detect a position of the teat liner may alternatively be used as a pulsation pressure gauge. Examples of such alternative sensors are an airflow sensor and a teat liner position sensor, such as an electromagnetic sensor or a camera in the pulsation space or teat space. These alternative sensors can then also send a measured value or other signal to the control unit, on the basis of which the control unit can adjust the passage of the first and/or second valve.

In embodiments, the control unit comprises a memory with a desired pressure value in the pulsation space, in particular as a function of time, wherein the control unit is furthermore programmed and configured to compare the measured pressure value and the desired pressure value, in particular as a function of time, and wherein the passage of the first and/or of the second valve is furthermore adjustable by the control unit via the control signals based on said comparison. With this embodiment, a desired pulsation profile is stored in the memory, as it were, with the control unit comparing the measured pressure value ("Istwert") with the pressure value stored in the memory ("Sollwert"), respectively. In this case, it already suffices if such a comparison is carried out at a fixed point in time during the pulsation, so that one pressure value in principle suffices. Obviously, a comparison at several points in time and thus comprising several stored pressure values is more accurate. All this may also depend on the speed with which the pressure gauge can be read out. It should be noted that in this embodiment, as well as all subsequent embodiments, the pressure gauge and the pressure values could be replaced and/or supplemented by alternative sensors and the associated parameter values.

The control unit may, for example, be efficiently configured to adjust the passage of the first and/or of the second valve by means of feedback. In this case, the device may couple, for example, an error value as difference value of the measured pressure and the desired pressure to the associated control signals. By modifying the control signals based on the measured error, the error can be minimized in the subsequent pulsations.

In embodiments, the control unit furthermore comprises a memory for storing generated control signals associated with at least one applied pulsation, wherein the control unit is furthermore configured to generate control signals for the purpose of a new pulsation based on said comparison and on at least some of the stored control signals. This embodiment is suitable, for example, to perform the above-described feedback. Alternatively, it is also possible to configure the control unit to generate the new control signals in an alternative way, in particular on the basis of a non-causal model which is stored in the control unit. This means, in particular, that the control unit is configured to change the passage of the first and/or the second valve even before the desired pressure value has to change over time. In other words, the control unit is now configured to take into account a delay in the system, that is to say in the milking device. Since the pressure value is a direct consequence of moving volumes of air and said movement takes time, there will often be a certain degree of delay regarding the effects of modifying a passage. It is therefore advantageous if the device is configured to change the respective passage or passages before an effect is to occur.

In embodiments, the memory comprises an animal-specific or groupwise pressure value, in particular as a function of time, and the milking device comprises an animal recognition system which is operatively connected to the control unit. Thus, it is possible for the control unit to set the desired pulsation pressure value, or the desired pulsation profile, for each animal or group of animals. For example, there are animals with relatively sensitive teats which require a more gentle pulsation. There may also be differences with regard to milking speed, which may also produce differences in the desired pulsation profile. Advantageously, the memory comprises more than one pressure value (profile) which can be adjusted as a function of time for each individual animal or group of animals, wherein the device is configured to select one of the stored profiles as a function of time on the basis of an additional milking parameter determined by the milking device. To this end, the milking device comprises suitable sensors, such as a milk flow sensor or the like. It should furthermore be noted here that these recognition devices are generally known in the prior art.

In particular, the milking device furthermore comprises an input device for inputting or changing the desired pressure value, in particular as a function of time, and more particularly for at least an animal or group of animals. Such an input device may comprise, for example, a keyboard, internet connection, etc., wherein the desired pressure value or the desired pulsation profile is actively changed by the user. Alternatively, the input device may also form part of the control unit, due to the fact that it makes a choice, based on an additional measured milking parameter, such as a milk flow, from the stored pressure value or pulsation profiles in order thus to change the desired pressure value or the desired pressure profile.

The invention also relates to a pulsation device for use in a milking device according to the invention. Such a pulsation device is configured to apply a pressure that varies in pulsations to the pulsation space of a milking cup in order to open and close the teat liner of the teat cup, and comprises a supply line which is controllable by a first operable valve, in particular closable, for supplying a first pressure, a supply line which is controllable by a second operable valve, in particular closable, for supplying a second pressure, which is a lower pressure than the first pressure, and a control unit which is configured to generate control signals for operating the first valve and the second valve, wherein the first valve, and preferably also the second valve, is a controllable valve having a passage which is adjustable by means of the control signals, wherein the passage of the first valve, and preferably of the second valve, respectively, is adjustable during at least a pulsation phase by the control unit via the control signals. The advantages of this pulsation device have already been described for the milking device and therefore do not have to be repeated here.

The milking device according to the invention furthermore comprises the customary components of milking devices, such as a vacuum source, for the purpose of a milking vacuum and for the purpose of a pulsation vacuum, that is to say the lower second pressure, as well as milking lines, a milking gauge, etc. Advantageously, the milking device is a robot milking device and then also comprises a robot arm for connecting the teat cups to teats of a dairy animal, an animal recognition device, a teat recognition device. These components are outside the scope of the present invention and are furthermore known per se in the prior art.

Figure 2:
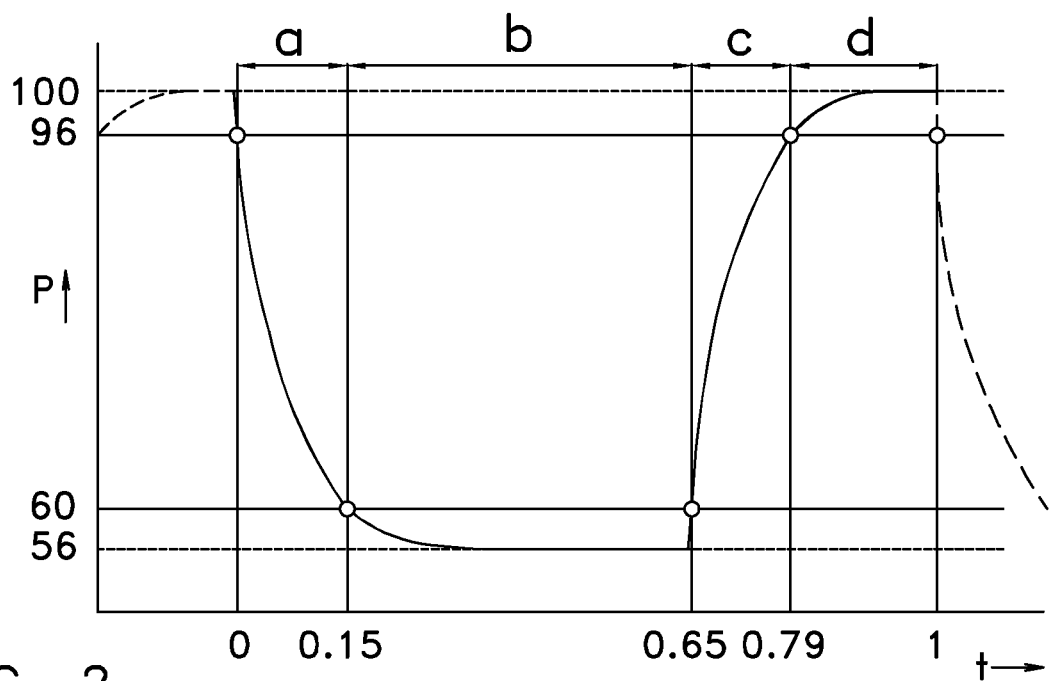
Figure 3:
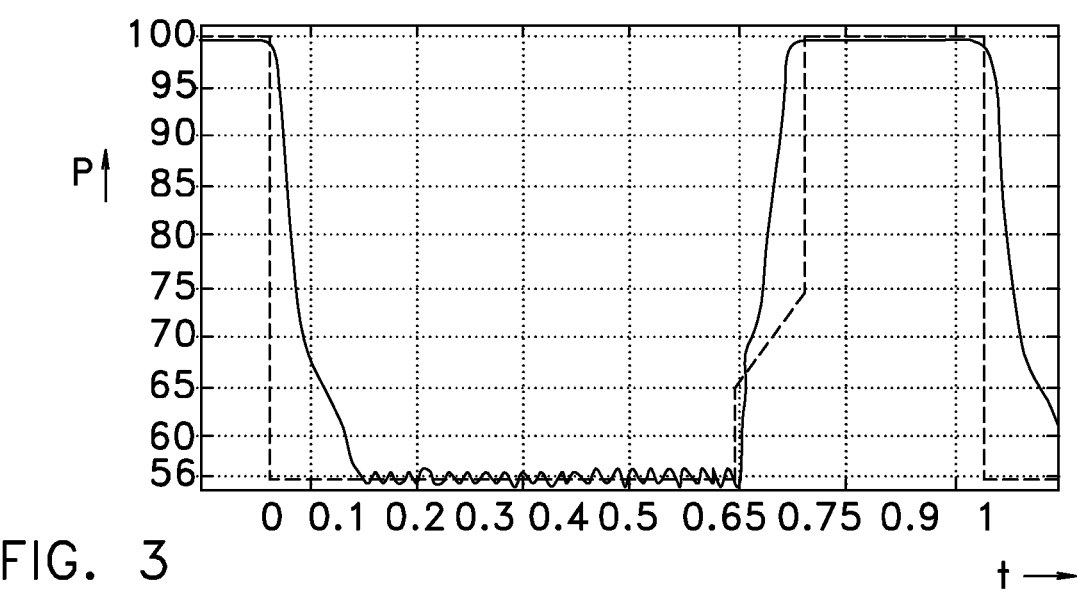
Figure 4:
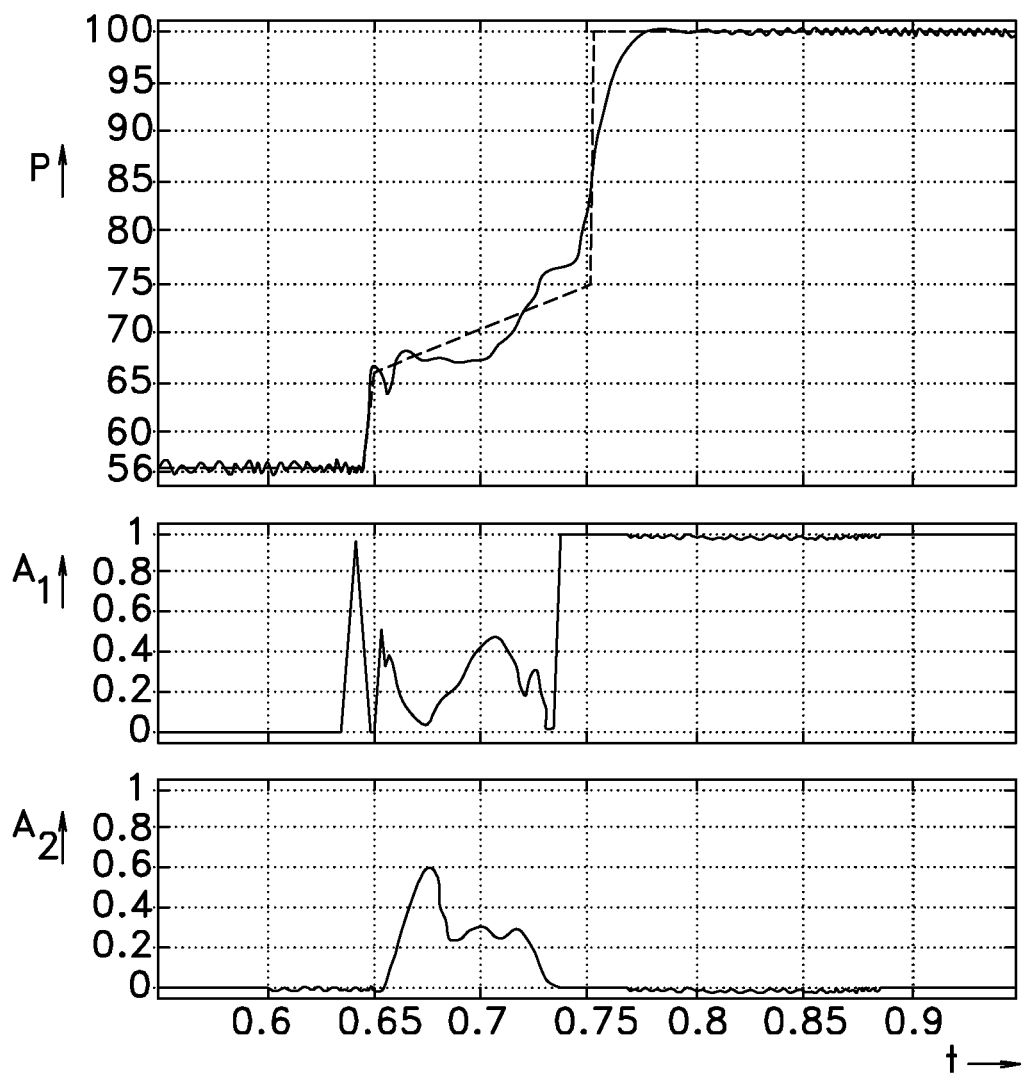

The invention will be explained in more detail below with reference to the attached drawing, which shows an exemplary embodiment of the invention and in which:

FIG. 1 shows a diagrammatic view of a milking device according to the invention, FIG. 2 shows a standard graph of a pulsation profile, FIG. 3 shows a graph of a desired pulsation profile and a common pulsation profile, and FIG. 4 shows a diagram with the desired pulsation profile from FIG. 3, an actual pulsation profile and valve passages as a function of time.

FIG. 1 shows a highly diagrammatic view of a milking device according to the invention. The milking device 1 comprises a teat cup 2 with a cup wall 3 and a teat liner 4 and a pulsation space 5 in between. The teat liner 4 lines a teat space 6 for accommodating a teat of a dairy animal (not shown here), which teat space runs out into a milk discharge 7. The milking device furthermore comprises a pulsation device which is denoted overall by reference numeral 8 and which comprises a pulsation line 9, a first operable valve 10 and a second operable valve 11 in, respectively, a supply line for ambient air 12 and a vacuum supply line 13, a pump 14, a pulsation pressure gauge 15 and a control unit 16 with a memory 17 and an input device 18. Reference numeral 19 denotes an animal recognition device.

The teat cup 2 is a teat cup which is generally known per se and wherein a pulsation is generated in the pulsation space 5 by means of the pulsation device 8. In this case, the teat liner 4 will be open when the pressure in the pulsation space is low (solid line) and will fold and close the teat space 6 (dashed line) when the pressure is relatively high, such as at ambient pressure.

The pressure in the pulsation space 5 which alternates for the purpose of pulsation is provided by operating, via the control unit 16, the first and second operable valves 10 and 11 which form a connection with a first pressure, usually ambient air, and a second, lower pressure, which is generated by means of the pump 14, respectively. The control unit 16 generates operational control signals in order to operate the valves 10 and 11.

More generally, the valves 10 and 11 are operable restrictions and comprise, for example, electromagnetic valves or other ways of providing a different passage for the supply line 12 or 13, respectively.

The pulsation pressure gauge 15 measures the pressure in the pulsation space 5 and sends a corresponding signal regarding the measured value to the control unit 16. At least on the basis of the measured pressure value, the control unit 16 can emit suitable control signals to the valves 10 and/or 11. The memory 17 may contain data on the basis of which the control unit 16 can further determine the desired control signals. Such data contain, for example, a desired pulsation profile, control signals which have been generated previously and stored and/or pressure values of the pulsation gauge 15. Furthermore, by means of the input device 18, the memory 17 may be provided with new or other information, such as a change in the desired pulsation profile, data of new animals and/or groups of animals, etc. In this case, the input device 18 may comprise a keyboard, a disk drive, an internet connection, etc.

Reference numeral 19 denotes an animal recognition device for recognizing animals to be milked by the milking device 1. Such an animal recognition device comprises, for example, a so-called tag reader, which is generally known in the prior art. Details of such an animal recognition device are not important for the device as such. By means of the animal recognition device, it is possible to determine the identity and to send it to the control unit 16 which can in turn retrieve the associated animal and pulsation data and the like from the memory 17.

The action of a pulsator can be explained in more detail as follows. With prior-art pulsators, the single pulsator valve or in some cases each pulsator valve is operated in a position which alternates between fully open and completely closed. This means that no further control can be exerted in the airflows from and to the pulsation space 5. With the present invention, the passage of at least the first valve 10 and, in particular embodiments, also of the second valve 11 can be controlled by control signals from the control unit 16. By suitably varying the passage of the one or two valves, the airflow to, and in particular also from, the pulsation space 5 can be controlled even better. This counteracts in particular the drawbacks of the folding of the teat liner 4 from the open to the closed position, as a result of which a teat which is accommodated in the teat space 6 is subjected to less stress.

FIG. 2 shows an idealized pulsation profile, with time being shown on the X axis in relative units or in seconds if a pulsation lasts exactly 1 second, which is not unusual. The Y axis shows the absolute pressure in the pulsation space in kPa. In this pulsation profile, movement of the teat liner is not taken into account, in particular no folding thereof or any other "spontaneous" change in volume. Furthermore, it is based on the premise that an 'open/closed' valve control unit of a pulsation device is used, so that the pressure difference is gradually and smoothly reduced.

The pulsation profile comprises the four standard phases a, b, c and d. For this pulsation profile, the milking vacuum in the teat space has been assumed to be 40 kPa, so that the absolute pressure in this teat space is in principle 60 kPa. For the phase transitions between the 4 phases, use has been made in this case of the standard 10 percent of the pressure difference, so that the transition from c to d and from d to a takes place at 96 kPa. Furthermore, the pulsation vacuum has been set at a value of 56 kPa, so that the transition from a to b and from b to a takes place at 60 kPa.

FIG. 3 shows a diagram with both an actual practical pulsation profile (solid line) and an alternative desired pulsation profile (dashed line).

The solid line is a representation of a pulsation profile which will occur in practice with a prior-art milking device when the pulsation device is controlled in an "open/closed" fashion. The theoretical pulsation profile of FIG. 2 then changes into, for example, the illustrated pulsation profile occurring in practice, where the effect of the folding of the teat liner can be seen as a ripple at a pressure value around 65 kPa in the falling section and around a pressure value of 70 kPa in the rising section of the pulsation profile. In particular, the quick folding in the rising section of the pulsation profile is undesired and may be prevented by means of the present invention. To this end, it is expedient for the pulsation profile to be much slower particularly around the pressure value at which folding takes place. This can be seen in the diagram by the fact that the pressure in the desired pulsation profile rises much more slowly around a value of 70 kPa. By contrast, in this theoretical pulsation profile, it has been decided to opt for a decrease in pressure which is as quick as possible as the desired course when opening the teat liner.

In order to achieve the desired pulsation profile in practice, the control unit will have to perform a different actuation of the one or more pulsation valves than an "open/close" control.

FIG. 4 shows an example of how the first valve 10 from FIG. 1 and the second valve 11 are actuated to achieve the desired pulsation profile to the greatest possible degree. The top part of the diagram shows a portion of the desired pulsation profile; more specifically the rising section (dashed line) and the pulsation pressure measured in practice at the given control signals (solid line). The central part of the diagram show the passage of the first valve 10 with the same time axis, in relative units, and the bottom part shows the passage of the second valve 11.

It can be seen that the first valve 10 is opened for a short time before the desired rise in pressure and then closed again, and an irregular curve shows the corresponding irregular and partial opening and closing of the valve, up to approximately t=0.73, after which the valve is then opened completely. It can clearly be seen that periods where the valve opens further and less far alternate, and that various intermediate positions between a fully closed and a fully open position are actuated. It can be seen that the pulsation pressure rises from the lowest to the highest position in approximately 0.12 seconds, whereas this takes place in approximately 0.10 seconds in the practical pulsation from FIG. 3. By contrast, the folding in the last-mentioned profile takes place in a few hundredths of seconds, whereas this period of time is at least three times as long according to the currently measured profile in FIG. 4. This also means that folding proceeds significantly more slowly and therefore more gently.

The bottom diagram shows a passage of the second valve 11 as a function of time. It should be noted that it is also repeatedly actuated and in different passage positions, alternately larger and smaller. It should furthermore be noted here that this embodiment, in which both valves are operated simultaneously in a single phase of the pulsation, may have a further positive effect on, for example, the air flow and the folding of the teat liner, if part of any surplus of air flowing in can be captured by opening the second valve to the vacuum supply line. Conversely, the air supply to the teat space can be controlled better by slightly opening the vacuum supply via the second valve during the c phase in principle as standard, in which case the net air supply to the teat space can be increased by (temporarily) closing the second valve. It will be clear that the present invention further increases the possibilities of influencing the air supply from and to the teat space, and thus the pulsation pressure and the folding of the teat liner. An advantage of such a kind of actuation is that it is in turn possible to reduce the pressure in the pulsation space, or at least to prevent an increase thereof. For example, the folding of the teat liner may be slowed down by temporarily sucking air from the pulsation space again at that point in time. Other combinations are also conceivable, and it should furthermore be noted that it is not necessary to operate both valves simultaneously, but that the advantage of the invention can often also be achieved by means of the described control unit with a single valve.

The passage of the first valve 10 and/or the second valve 11 illustrated in FIG. 4 can simply be brought about by actuating an electromagnetic coil in an electromagnetic embodiment of the respective valve 10, 11 by means of a corresponding electrical signal, in particular a current signal. This current signal will generate a corresponding strong magnetic field which will attract a magnetizable valve body in the valve to a greater or lesser degree, and accordingly control the passage of the valve. Obviously, there are other possible ways of controlling the valve position and thus the passage, in which case it should again be noted that "valve" in each case is to be understood as referring to the wider concept of "restriction". In case a restriction has a non-linear actuation, the control unit obviously has to be adapted in a corresponding manner.

It should be noted that, in the case of feedback control, the valve cannot be actuated before the measured pressure rises, since there is no change in pressure yet. Precisely by starting to actuate the valve earlier according to this embodiment, and thus opening it, the delay time of air displacement in the system can be compensated for efficiently.

By means of the measured pressure values, either as a profile or as one or more pressure values over the course thereof, the control unit can furthermore improve control. In this case, the control unit compares the measured values to the desired profile, or the corresponding values in that profile, and looks at the difference or margin of error. If the measured pressure value is too high, the control unit can reduce the passage of the valve and vice versa. In this way, the control unit is in principle able to come increasingly closer to the desired profile. In this case, the control unit is advantageously configured to use the previous control signals, which may be stored in the memory, and the measured pressure signals.

The illustrated and described exemplary embodiments are not intended to be limiting, but only serve as an explanation of the invention, the scope of protection of which is determined by the attached claims.

The invention claimed is:

1. A milking device for milking a dairy animal, comprising:
   a teat cup with a cup wall and a teat liner and a pulsation space situated in between, and
   a pulsation device connected to the pulsation space, the pulsation device configured to apply a pressure that varies in pulsations to the pulsation space in order to open and close the teat liner, the pulsation device comprising:
      a first supply line comprising a first operable valve for supplying a first pressure, the first supply line being controllable by the first operable valve,
      a second supply line comprising a second operable valve for supplying a second pressure, the second pressure being a lower pressure than the first pressure, and the second supply line being controllable by the second operable valve, and
      a control unit configured to generate control signals for operating the first valve and the second valve,
   wherein the first valve is a controllable valve having a passage which is adjustable by means of the control signals,
   wherein the passage of the first valve and a passage of the second valve are simultaneously adjustable by the control unit via the control signals during at least one pulsation phase.

2. The milking device as claimed in claim 1, wherein the passage of the first valve and/or the passage of the second valve is adjustable in several intermediate positions by the control unit via the control signals during one pulsation phase.

3. The milking device as claimed in claim 1, wherein the passage of the first valve and/or the passage of the second valve is continuously adjustable in several intermediate positions by the control unit via the control signals during one pulsation phase.

4. The milking device as claimed in claim 1, wherein a pulsation has a, b, c and d phases, and wherein the passage of the first valve and/or the passage of the second valve during the c phase and/or the a phase is adjustable by the control unit, via the control signals, in several intermediate positions with alternately enlarged and reduced passages.

5. The milking device as claimed in claim 1, wherein the passage of the first valve and the passage of the second valve are alternately adjustable by the control unit via the control signals during at least one pulsation phase.

6. The milking device as claimed in claim 1, wherein the passage of the first valve and the passage of the second valve are repeatedly adjustable by the control unit via the control signals during at least one pulsation phase.

7. The milking device as claimed in claim 1, wherein at least one of the first and second valves comprises an electromagnetic valve.

8. The milking device as claimed in claim 7, wherein the electromagnetic valve comprises a valve body and a coil.

9. The milking device as claimed in claim 1, further comprising a pulsation pressure gauge for measuring a value of the pressure in the pulsation space and sending the measured pressure value to the control unit, and wherein the passage of the first valve and/or the passage of the second valve is adjustable by the control unit via the control signals in dependence of the measured pressure value.

10. The milking device as claimed in claim 9, wherein the control unit comprises a memory with a desired pressure value in the pulsation space,
   wherein the control unit is further programmed and configured to compare the measured pressure value and the desired pressure value,
   and wherein the passage of the first valve and/or the passage of the second valve is further adjustable by the control unit via the control signals based on said comparison.

11. The milking device as claimed in claim 10, wherein the control unit further stores generated control signals associated with at least one applied pulsation in the memory, and
   wherein the control unit is further configured to generate control signals for the purpose of a new pulsation based on said comparison and on at least some of the stored control signals.

12. The milking device as claimed in claim 10, wherein the memory comprises an animal-specific or groupwise pressure value and
   wherein the milking device comprises an animal recognition system operatively connected to the control unit.

13. The milking device as claimed in claim 10, further comprising an input device for inputting or changing the desired pressure value.

14. The milking device as claimed in claim 10, wherein the desired pressure is a desired pressure value in the pulsation space as a function of time.

15. The milking device as claimed in claim 10, wherein the desired pressure value is a desired pressure value as a function of time for at least one animal or group of animals.

16. The milking device as claimed in claim 1, wherein the first and second supply lines are closeable by the first and second operable valves, respectively.

17. The milking device as claimed in claim 1, wherein the second valve is adjustable by means of the control signals.

18. The milking device as claimed in claim 1, wherein at least one of the first and second valves comprises a mechanically controlled butterfly valve.

* * * * *